United States Patent [19]
Saini

[11] Patent Number: 5,421,021
[45] Date of Patent: * May 30, 1995

[54] CIRCUIT INCLUDING A LATCHING UNIT FOR HOLDING INSTRUCTIONS DURING EXECUTION FOR RE-EXECUTION FOLLOWING EXCEPTION HANDLING

[75] Inventor: Avtar K. Saini, San Jose, Calif.

[73] Assignee: Intel Corporation, Santa Clara, Calif.

[ * ] Notice: The portion of the term of this patent subsequent to Jul. 28, 2009 has been disclaimed.

[21] Appl. No.: 47,696

[22] Filed: Apr. 14, 1993

Related U.S. Application Data

[60] Division of Ser. No. 880,133, May 6, 1992, abandoned, which is a continuation of Ser. No. 298,520, Jan. 18, 1989, Pat. No. 5,134,693.

[51] Int. Cl.$^6$ .............................................. G06F 9/22
[52] U.S. Cl. ............................... 395/800; 364/229.2; 364/247.6; 364/261.6; 364/263.2; 364/270.1; 364/DIG. 1; 364/941.1; 364/230.2; 364/262.8; 395/375
[58] Field of Search ................................ 395/375, 800

[56] References Cited

U.S. PATENT DOCUMENTS

| | | |
|---|---|---|
| 4,179,737 | 12/1979 | Kim . |
| 4,398,244 | 8/1983 | Chu et al. . |
| 4,429,361 | 1/1984 | Maccianti et al. . |
| 4,438,492 | 3/1984 | Harmon, Jr. et al. . |
| 4,476,523 | 10/1984 | Beauchamp . |
| 4,598,356 | 7/1986 | Dean et al. . |
| 4,719,565 | 1/1988 | Moller . |
| 4,750,110 | 6/1988 | Mothersole et al. . |
| 4,758,950 | 7/1988 | Cruess et al. . |
| 4,763,294 | 8/1988 | Fong . |
| 4,791,551 | 12/1988 | Garde . |
| 4,901,235 | 2/1990 | Vora et al. . |
| 4,912,635 | 3/1990 | Nishimukai et al. . |
| 4,928,223 | 5/1990 | Dao et al. . |
| 5,043,867 | 8/1991 | Bhandarkar et al. . |
| 5,095,426 | 3/1992 | Senta ............... 395/375 |
| 5,109,514 | 4/1992 | Garner ............ 395/125 |

*Primary Examiner*—Ken S. Kim
*Attorney, Agent, or Firm*—Blakely, Sokoloff, Taylor & Zafman

[57] ABSTRACT

A method of handling a fault associated with a first floating point instruction upon reaching the next sequential floating point instruction is described. The first floating point instruction is decoded. A first floating point microinstruction received from a control memory is stored in a first latching means and in a second latching means. The next sequential floating point instruction is decoded. There is a jump to a plurality of exception handler microinstructions stored in the control memory, the jump occurring upon the detection of the fault associated with first floating point instruction. The plurality of exception handler microinstrictions includes an exception handler floating point microinstruction. The exception handler floating point microinstruction received from the control memory is stored in the first latching means, replacing the previous microinstruction stored in the first latching means. The exception handling floating-point microinstruction received from the control memory is not stored in the second latching means. The exception handler floating point microinstruction stored in the first latching means is executed. The floating point microinstruction stored in the second latching means is executed. A method for allowing floating point instructions to be executed in a microprocessor in parallel with non-floating point instructions is also described. Circuitry allowing floating point instructions to be executed in parallel with non-floating point instructions is also described.

19 Claims, 5 Drawing Sheets

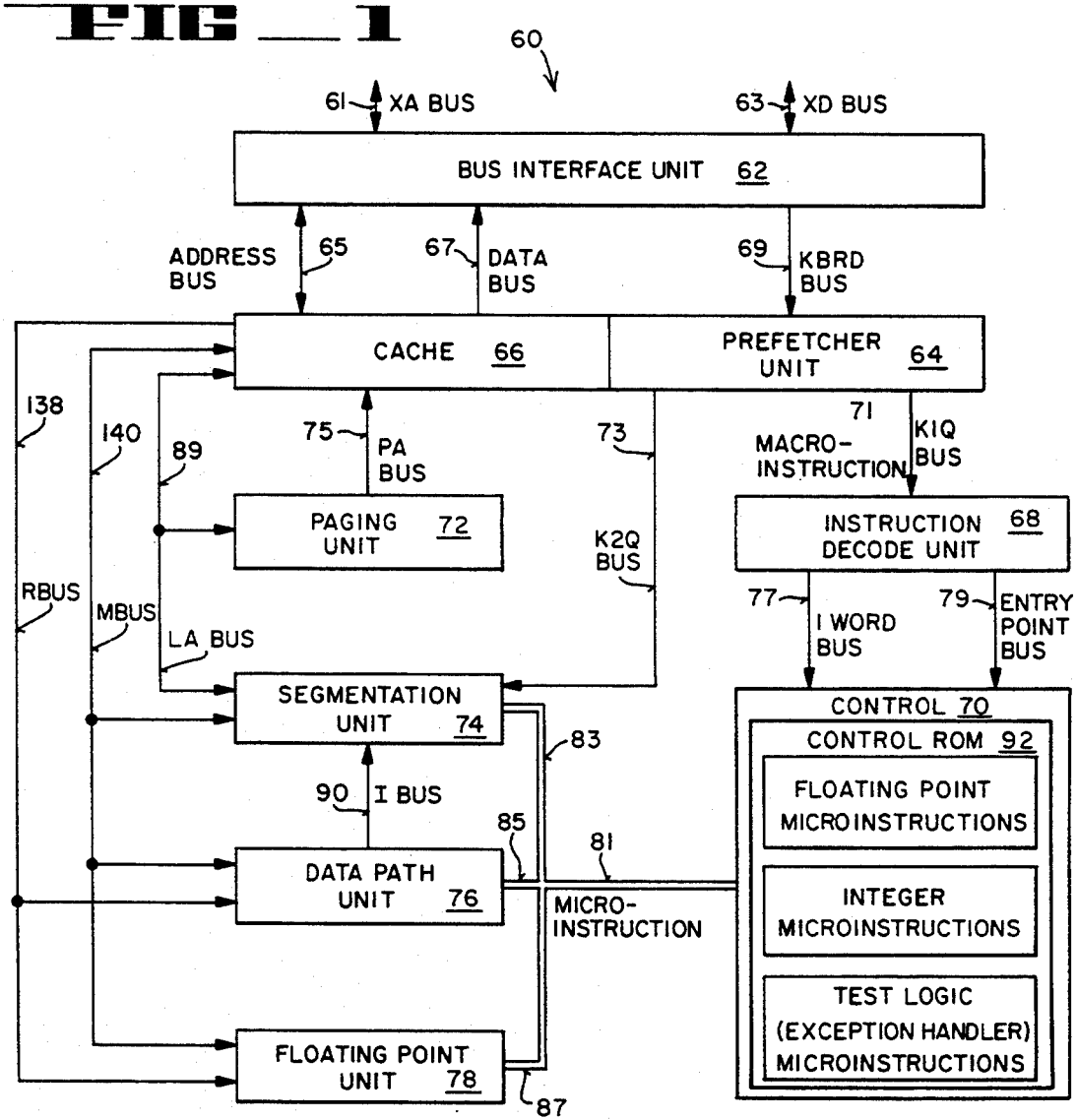

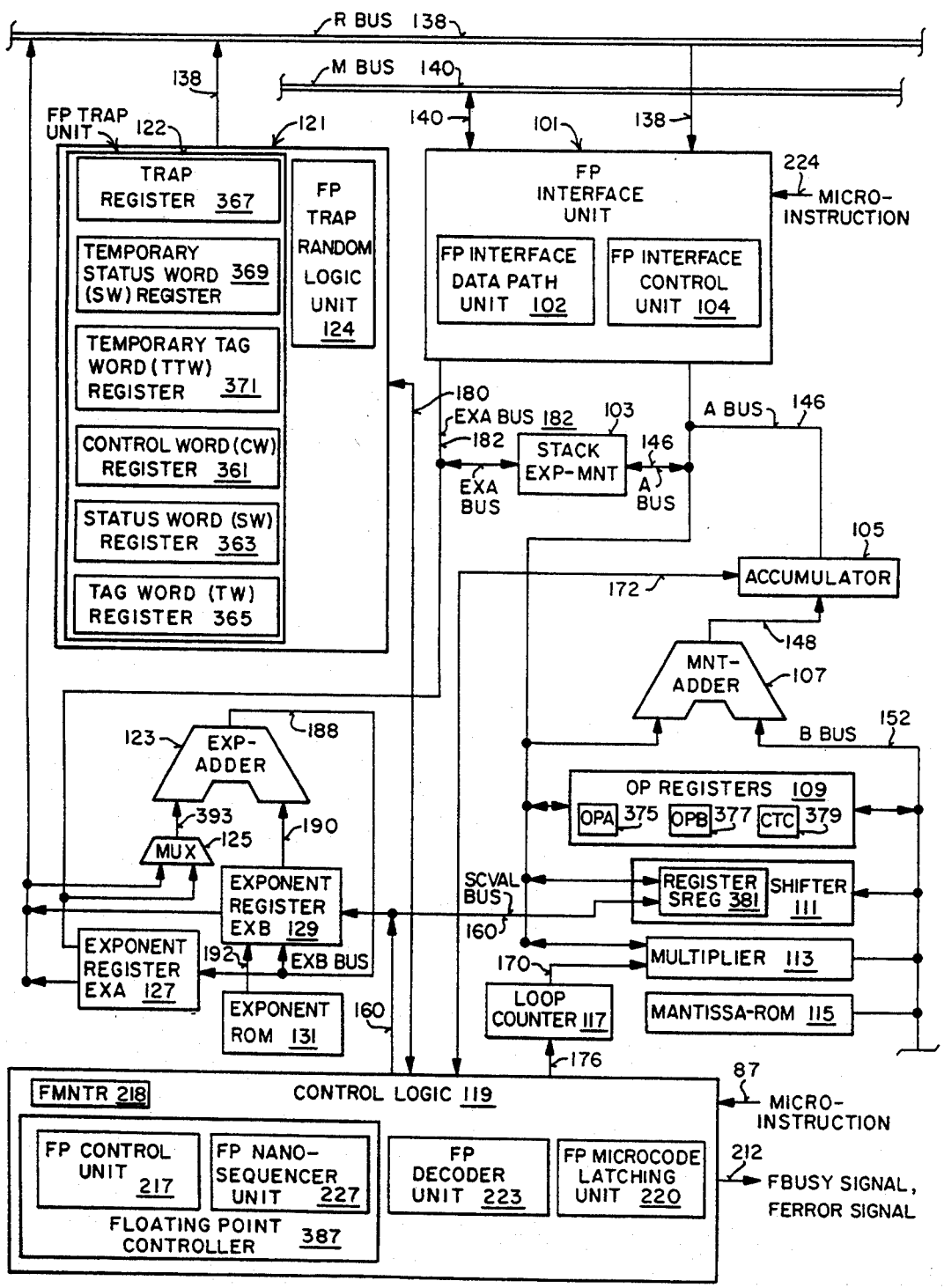

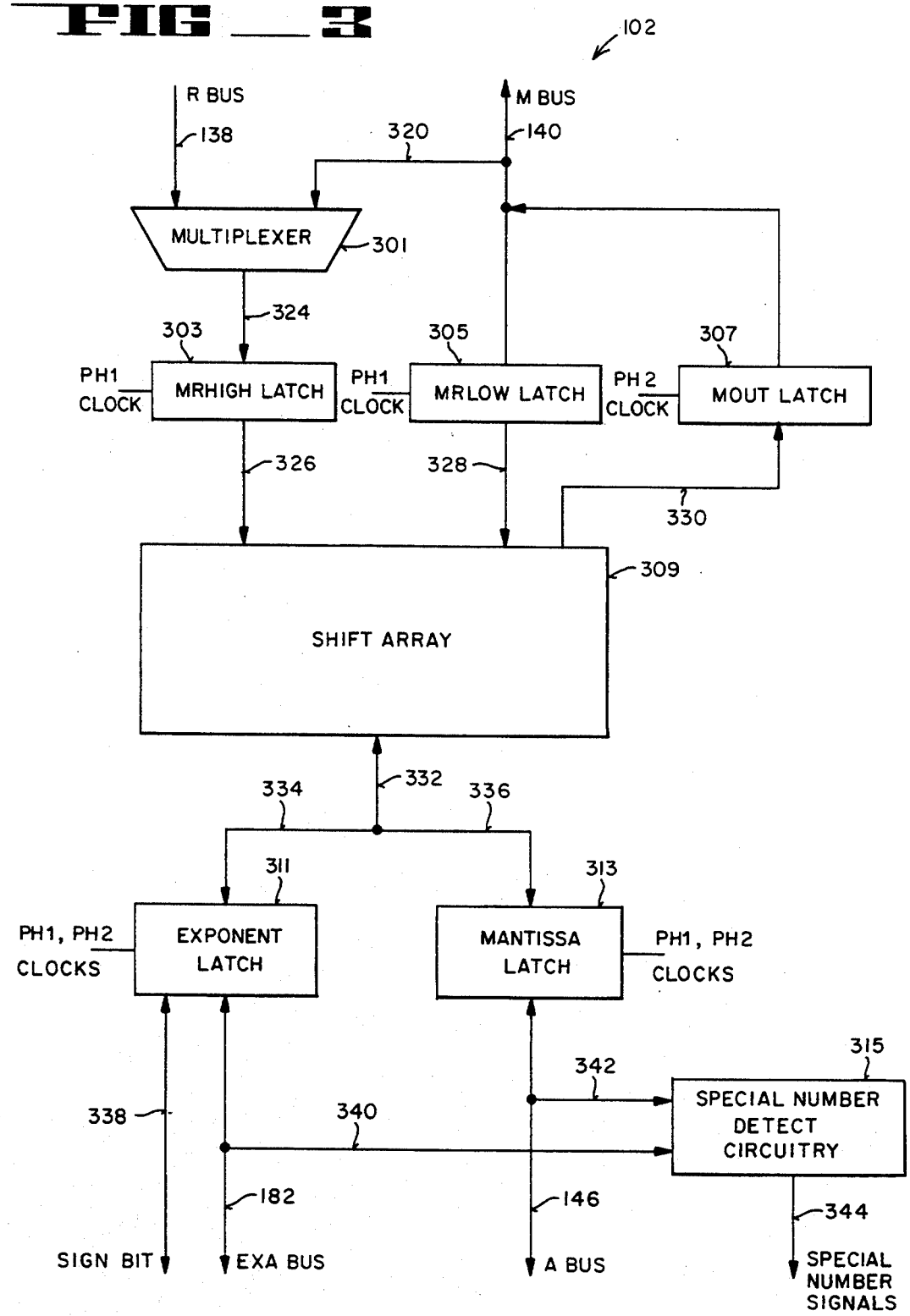

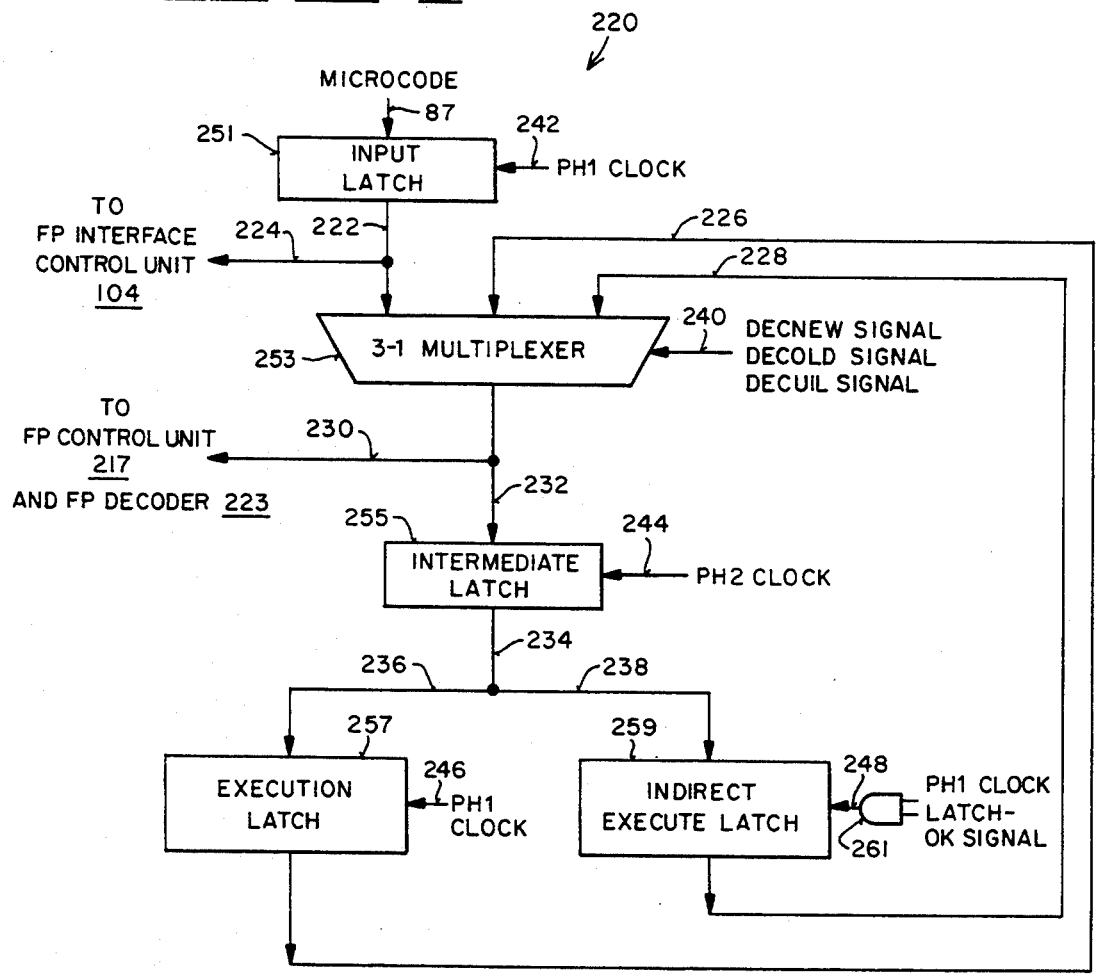
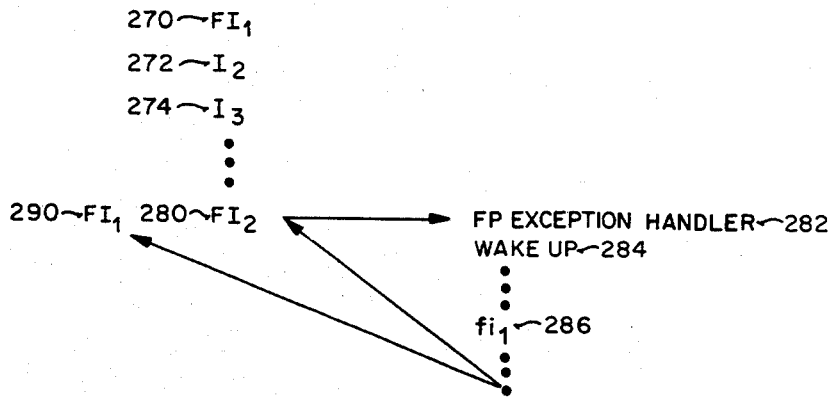

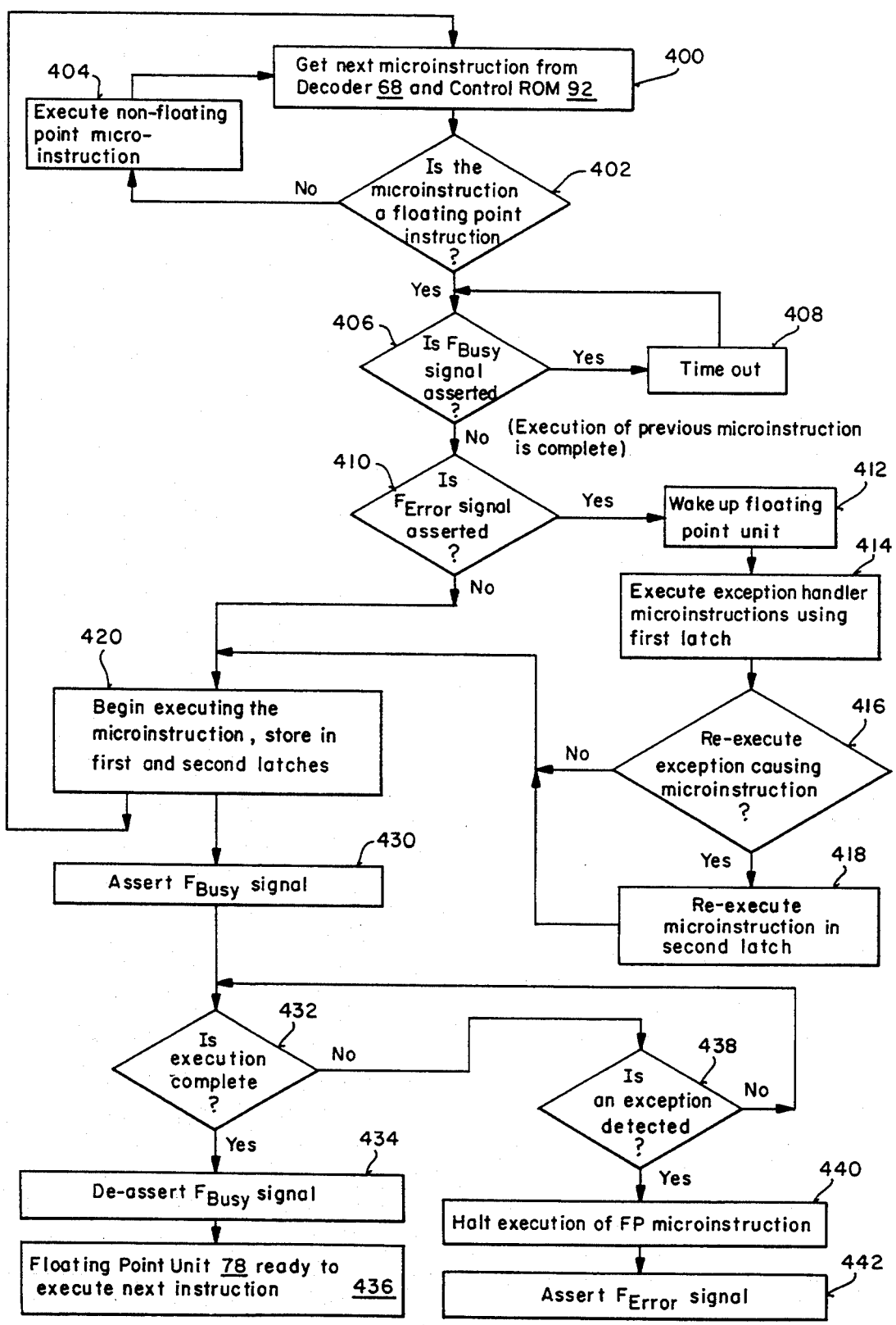

CIRCUIT INCLUDING A LATCHING UNIT FOR HOLDING INSTRUCTIONS DURING EXECUTION FOR RE-EXECUTION FOLLOWING EXCEPTION HANDLING

This is a divisional application of Ser. No. 07/880,133, filed May 6, 1992, now abandoned, entitled "System for Handling Exceptions Occurring During Parallel Execution of Microinstructions", which is a continuation application of Ser. No. 07/298,520, filed Jan. 18, 1989, now issued U.S. Pat. No. 5,134,693, entitled "System for Handling Occurrence of Exceptions of Microinstructions While Running Floating Point and Non-Floating Point Instructions in Parallel".

FIELD OF THE INVENTION

The present invention pertains to the field of floating point instruction execution in a microprocessor. More particularly, this invention relates to the execution of floating point instructions in parallel with non-floating point instructions.

BACKGROUND OF THE INVENTION

To represent a large dynamic range of numbers with relatively few bits, floating point representation can be used to explicitly encode a scale factor in each number. A floating point number includes a mantissa, an exponent, and sign bit that indicates the sign of the mantissa. In contrast, integer instructions, and other non-floating point instructions, typically do not include exponent bits. Examples of floating point numbers include (1) single precision floating point real numbers, (2) double precision floating point real numbers, and (3) extended precision floating point real numbers.

A computer instruction written in a floating point format typically requires more processor clock cycles to complete than a corresponding instruction written in an integer or non-floating point format. For example, instructions requiring the addition, subtraction, multiplication, or division of floating point numbers each require the execution of an algorithm with several steps. One of the steps is the normalization of the result. A non-zero floating point number is normalized if the left-most bit of the mantissa is non-zero. The normalized representation of zero is all zeroes. A denormalized number is a number not in the normalized format.

A computer can have integer instructions and floating point instructions intermixed. For example, a series of integer instructions can follow a floating point instruction. As discussed above, floating point instructions typically take longer to execute than integer instructions. For example, an integer ADD instruction typically takes one clock cycle. On the other hand, a floating point ADD instruction typically takes 8 to 10 clock cycles to complete. An integer LOAD instruction typically takes one clock cycle to complete. On the other hand, a floating point LOAD instruction typically takes multiple clock cycles to complete. Moreover, typically 25 to 30 percent of all instructions in a work station environment are floating point instructions.

In one past approach, floating point instructions are handled by a separate chip such as the 80387 80-bit CHMOS III Numeric Processor Extension sold by Intel Corporation of Santa Clara, Calif. Integer instructions, however, are handled by a separate main microprocessor, such as the 80386 32-bit CHMOS microprocessor sold by Intel Corporation.

The 80387 is a co-processor. The 80386 microprocessor decodes a floating point instruction and passes to the 80387 all the relevant information from the floating point instruction needed by the 80387 to execute the floating point instruction. Once that information is passed from the 80386 to the 80387, the 80386 can proceed to execute any subsequent integer instructions until the 80386 reaches the next floating point instruction. The 80387 has its own control read-only memory ("ROM") and control logic, and the 80386 in turn has its own control ROM and control logic.

Thus, with the prior two chip 80387 and 80386 approach, floating point instructions are executed in parallel with non-floating point instructions. The passing of relevant floating point information between the 80386 and the 80387 imposes a significant performance penalty, however, from an overall system performance point of view in the form of interface overhead.

In some other prior approaches, a floating point unit is placed on the same chip as the microprocessor. This removes the interface overhead that would otherwise occur if the floating point unit was on a separate chip. In those past approaches that put the floating point unit on the same chip as the microprocessor, the floating point instructions are not executed in parallel with the non-floating point instructions, however. Instead, all instructions are executed sequentially. In other words, the microcomputer waits for the execution of a floating point instruction before moving on to the next instruction. Therefore, although some performance is gained by removing interface overhead, some performance is lost because of the lack of parallelism.

Furthermore, although the floating point unit is on the microprocessor chip in those past non-parallel approaches, the floating point unit nevertheless has its own control ROM and control logic, and the microprocessor in turn has its own separate control ROM and control logic.

If the floating point unit could be placed on the microprocessor chip in a way that floating point instructions could be executed in parallel with integer instructions, there would be a gain in performance. One way to do this might be to introduce parallelism but yet have two separate microcoded control ROMs—namely, a floating point control ROM and an integer control ROM.

One disadvantage of this multiple control ROM approach is that it would require the duplication of the control logic—there would need to be control logic at the periphery of each control ROM.

Another disadvantage of the multiple control ROM approach is that it would add to the complexity of the "who is in charge" decision.

A further disadvantage of this multiple control ROM approach is that it would require additional hardware to allow the sharing of resources, and such hardware would be complex and take additional space in silicon. For example, if a floating point execution unit and an integer execution unit were to operate at once, those units might need to share the same bus or the same addressing unit. Complex circuitry would be required to oversee such sharing of resources.

Another consideration with respect to floating point units is that exception conditions must be handled somehow, regardless of whether a parallel or non-parallel approach is used. Although the prior non-parallel instruction execution method imposed a performance penalty, the handling of exception conditions is nevertheless a straightforward task if there is no parallelism. Exceptions are handled as soon as they arise if there is no parallelism.

Examples of those exceptions are invalid operation, denormalized operand, zero divisor, overflow, underflow, and inexact result in terms of precision. Microcode is used to assist the hardware in handling the exceptions. The exceptions are divided into two types of problems: (1) pre-execution assist and (2) post-execution fault. With pre-execution assist, the microcode corrects the problem before execution is finished. With post-execution faults, the problems are corrected after instruction execution.

SUMMARY AND OBJECTS OF THE INVENTION

In view of limitations of known systems and methods, one of the objectives of the present invention is to provide an improved method and circuitry for allowing floating point instructions to be executed in a microprocessor in parallel with non-floating point instructions.

Another objective of the present invention is to provide an improved method of handling an exception associated with the first floating point instruction upon reaching the next sequential floating point instruction.

These and other objects of the invention are provided for by a method of handling an exception associated with a first floating point instruction upon reaching the next sequential floating point instruction. The first floating point instruction is decoded. A first floating point microinstruction received from a control memory is stored in a first latching means and in a second latching means. The next sequential floating point instruction is decoded. There is a jump to a plurality of exception handler microinstructions stored in the control memory, the jumping occurring upon the detection of the exception associated with the first floating point instruction. The plurality of exception handler microinstructions include an exception handler floating-point microinstruction. An exception handler floating point microinstruction received from the control memory is stored in the first latching means, replacing the previous microinstruction stored in the first latching means. The exception handler floating point microinstruction is not stored in the second latching means. The exception handler floating point microinstruction stored in the first latching means is executed.

The above-mentioned objects and other objects of the invention are also provided for by circuitry in a microprocessor allowing floating point instructions to be executed in parallel with non-floating point instructions. The circuitry includes means for decoding floating point instructions and non-floating point instructions. The circuitry also includes a control memory coupled to an output of the decoding means and including (1) a plurality of exception handler microinstructions including a floating point microinstruction and a non-floating point microinstruction, (2) a non-exception handler floating point microinstruction, and (3) a non-exception handler non-floating point microinstruction, wherein the control memory is for microprocessor control. The circuitry also includes means for executing a non-floating point microinstruction received from an output of the control memory. The circuitry also includes a latching unit coupled to the output of the control memory and in parallel with the non-floating point execution means, wherein the latching unit is for (1) storing a floating point microinstruction from the control memory in a first latching means, wherein the floating point microinstruction can be an exception handler floating point microinstruction and a non-exception handler floating point microinstruction, and for (2) storing a non-exception handler floating point microinstruction from the control memory in a second latching means. The circuitry also includes means for executing a floating point microinstruction received from an output from the latching unit.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements and in which:

FIG. 1 is a block diagram of the architecture of a microprocessor;

FIG. 2 is a block diagram of the architecture of the floating point unit of the microprocessor;

FIG. 3 is a block diagram of interface circuitry;

FIG. 4 is a block diagram of a microcode latching unit;

FIG. 5 illustrates a sequence of microinstructions and exception handler microinstructions; and FIG. 6 is a flow chart illustrating parallel operation of microinstructions and exception handling.

DETAILED DESCRIPTION

FIG. 1 is a block diagram of the architecture of a 32-bit microprocessor 60 that includes a floating-point unit 78. In a preferred embodiment of the present invention, floating point unit 78 is not on a separate chip, but is instead part of microprocessor 60. Floating point unit 78 contains the logic to execute the floating point instruction set associated with microprocessor 60. Floating point unit 78 can execute floating point instructions at the same time that other parts of microprocessor 60 are executing non-floating point instructions, and thus there is parallel operation. Floating point unit 78 is described in more detail below.

Microprocessor 60 is organized as follows. Bus interface unit 62 is responsible for fetching data from an external memory system (not shown). Bus interface unit 62 is also responsible for updating the external memory system when there is a write. Bus interface unit 62 provides the necessary interfaces between XA bus 61, XD bus 63, cache unit 66, and prefetcher unit 64. XA bus 61 is a 32-bit bus coupled between the external memory of microprocessor 60 and bus interface unit 62 for sending and receiving addresses. XD bus 63 is a 32-bit bus coupled between the external memory and bus interface unit 62 for sending and receiving data. Bus interface unit 62 is coupled to cache unit 66 via KBA bus 65, (also referred to as Address bus 65) which is a bidirectional address bus, and KBWR bus 67 (also referred to as Data bus 67). Bus interface unit 62 receives data from cache 66 via KBWR bus 67. Bus interface unit 62 sends data to prefetcher unit 64 via KBRD bus 69.

R bus 138, M bus 140, and LA bus 89 provide the main data path for microprocessor 60. R bus 138 couples cache 66 to data path unit 76 and floating point unit 78. M bus 140 couples cache 66 with segmentation unit 74, data path unit 76, and floating point unit 78. LA bus 89 couples cache 66 with paging unit 72 and segmentation unit 74.

Data path unit 76 is the main execution data path. Data path unit 76 contains the arithmetic logic unit ("ALU"), a register file, a barrel shifter, a constant ROM, a machine status word ("MSW"), and flags.

Segmentation unit 74 implements the segmentation part of the overall memory management model. I bus 90 couples data path unit 76 to segmentation unit 74. K2Q bus 73 couples prefetcher unit 64 with segmentation unit 74, and is a 32-bit bus.

Paging unit 72 implements a two-level paging mechanism of the overall memory management model. PA bus 75 is a 22-bit bus that couples paging unit 72 with cache 66.

Prefetcher unit 64 is responsible for supplying decode unit 68 with macroinstructions via K1Q bus 71.

Instruction decode unit 68 is responsible for decoding the incoming macroinstructions for microprocessor 60. Instruction decode unit 68 is coupled to control unit 70 via IWORD bus 77 and Entry Point bus 79.

Microprocessor 60 uses pipelined instructions. The instruction pipeline includes (1) a prefetch stage, (2) an instruction decode stage, (3) an execution stage, and (4) a write-back stage. With pipelining, when a decoded macroinstruction goes on to the execution stage, the instruction decode stage can begin for the next macroinstruction.

Control unit 70 is the microcode engine of microprocessor 60. Control unit 70 contains microcoded control ROM 92 and control logic that directs the actions of the other units of microprocessor 60, such as floating point unit 78. Instruction decode unit 68 sends entry point information to microcoded control ROM 92 over entry point bus 79 to indicate the location in control ROM 92 of the first microinstruction of a group of one or more microinstructions to be executed. The microinstructions themselves provide information to control unit 70 for control unit 70 to determine how many microinstructions are to be executed for a given entry point.

The control ROM microinstructions, once executed, provide control for microprocessor 60 and floating point unit 78.

The control unit handles most of the freeze conditions, such as when the Fbusy signal is on, as described below. Control unit 70 also contains test logic. The test logic of control unit 70 provides the proper microcode ROM vectoring for floating point exceptions.

Control unit 70 sends microinstructions to segmentation unit 74 via buses 81 and 83. Control unit 70 sends microinstructions to data path unit 76 via buses 81 and 85. Control unit 70 sends microinstructions to floating point unit 78 via buses 81 and 87.

The floating point microinstructions share the same microcode ROM 92 as the integer microinstructions. The floating point microinstructions take advantage of available early start actions and address calculation directed by instruction decoder 68. Once the necessary set-up is complete, floating point unit 78 is capable of executing arithmetic operations on its own, allowing the rest of microprocessor 60 to be freed up for other non-floating point operations. In other words, a non-floating point instruction can be executed in parallel with a floating point microinstruction.

FIG. 2 is a block diagram of the architecture of floating point unit 78. Floating point unit 78 is concerned with the execution of basic arithmetic floating point operations. The instruction decode, address calculation, and control functions for floating point instructions are, however, carried out by the portion of microprocessor 60 outside of floating point unit 78 as an extension of the integer instruction set charter for microprocessor 60.

Floating point unit 78 deals with faults generated off of a floating point microinstruction in the next sequential floating-point microinstruction. Non-floating point microinstructions can, however, be executed between the initial floating point microinstruction and the next sequential floating point microinstruction. In other words, the portion of microprocessor 60 outside of floating point unit 78 can execute interleaved non-floating point microinstructions while floating point unit 78 is operating on the current floating point microinstruction.

Floating point data is transferred between cache 66 (of FIG. 1) and interface unit 101 of floating-point unit 78. Floating point data could be received by interface unit 101 either from (1) M bus 140 or (2) both R bus 138 and M bus 140. Interface unit 101 is responsible for moving data between (1) R bus 138 and M bus 140 and (2) mantissa latch 313 and exponent latch 311, as described below in connection with FIG. 3.

FP interface data path unit ("Fint unit") 102 and FP interface control unit ("Fintr unit") 104 are parts of FP interface unit 101. Fint unit 102 contains the data path for FP interface unit 101. Fintr unit 104 decodes incoming microinstructions or microcode and issues control signals to Fint unit 102.

FIG. 3 illustrates Fint unit 102 in more detail in block diagram form. Incoming data is latched into MRhigh latch 303 and MRlow latch 305. Outgoing data is latched in Mout latch 307. Multiplexer 301 permits MRhigh latch 303 to get data from either M bus 140 or R bus 138, depending on the number of bits being transferred to floating point unit 78. Shift array 309 separates and aligns the incoming data from MRhigh latch 303 and MRlow latch 305 (via lines 326 and 328) into mantissa and exponent parts. Incoming data could be, for example, single, double, or extended precision floating point real numbers. The output from shift array 309 is latched into mantissa latch 313 and exponent latch 311 (via lines 332, 334, and 336). Exponent latch 311 is coupled to exponent EXA bus 182 and sign bit line 338. Mantissa latch 313 is coupled to mantissa Abus 146.

Special number detect circuitry 315 is coupled to exponent EXA bus 182 via lines 340. Special number detect circuitry 315 is also coupled to mantissa Abus 146 via lines 342. Special number detect circuitry 315 recognizes special cases of floating point operands when data is transferred on Abus 146 and EXA bus 182. Those special cases include operands that are not a number ("Nan"), denormalized numbers, infinity, and zero.

When a special number is detected, then special number signals are sent via lines 344 to FP control unit ("Fconr unit") 217 of FIG. 2, which then sets the appropriate bits in trap register 367 of FIG. 2. Thus, logic in Fint unit 102 detects cases such as the mantissa and exponent of a floating point number being all zeroes, but final determination of special numbers is done in Fconr unit 217.

Although Fint unit 102 is part of floating point unit 78, as shown in FIG. 2, Fint unit 102 appears to the microcode to be an extension outside of floating point unit 78. For example, while the floating point unit 78 is working on a multi-clock floating point instruction, the microcode can run bus cycles and get data for the next sequential instruction loaded into latches 303 and 305 of Fint unit 102 of interface unit 101. This is made possible by extra decode circuitry in Fintr unit 104. Fintr unit 104 has its own parallel set of microcode lines 224 for receiving control microinstructions from FP microcode latching unit ("Fmicro unit") 220, described below. Fintr unit 104 decodes the microcode information and then sends out control signals to Fint unit 102.

The mantissa data path is shown on the right side of FIG. 2. The mantissa data path comprises accumulator 105, mantissa adder 107, operand registers 109 (which includes registers OPA 375, OPB 377, and OPC 379), shifter 111 (which includes register SReg 381), mantissa multiplier 113, and mantissa ROM 115. Control for the mantissa data path comes from control logic 119.

Stack unit 103 contains registers forming a stack. Stack unit 103 is coupled to both Abus 146 and EXA bus 182, and is thus part of both mantissa and exponent paths.

The exponent data path is shown on the left side of FIG. 2 and comprises exponent adder 123, multiplexer 125, exponent register EXA 127, exponent register EXB 129, and exponent ROM 131. The exponent data path also includes EXA bus 182 and EXB bus 192. All control and random logic for the exponent data path is contained in Fconr unit 217, FP PLA unit ("Fpla unit") 227, and FP decoder unit ("Fdecr unit") 223 of control logic unit 119.

Exponent register EXB 129 can be examined to detect underflow and overflow fault conditions. Fconr unit 217 monitors EXB register 129 and makes the decision as to whether the fault is underflow or overflow.

Trap logic circuitry 121 of floating point unit 78 comprises FP trap unit ("FP trap unit") 122 and FP trap random logic ("FtrapR") 124. Ftrap unit 122 includes latches and bus drivers. FtrapR unit 124 includes peripheral random logic.

Ftrap unit 122 includes the following user-visible 16-bit registers: control word ("CW") register 361, status word ("SW") register 363, and tag word ("TW") register 365.

The control word in CW register 361 is a user-defined specification as to how the user would like the instructions executed. For example, CW register 361 includes information about which, if any, of the exceptions should be masked.

The status word in register 363 includes information about any unmasked exceptions that were encountered during execution of an instruction. Both the control word and the status word can be read from and written to R bus 138 by the microcode.

To allow an instruction to be restarted after the detection of a fault, temporary copies of the status word and tag word are used during operation. The temporary copy of the status word ("TSW") is stored in TSW register 369. The temporary copy of the tag word ("TTW") is stored in TTW register 371. After the point during instruction execution when the generation of an exception is no longer a possibility, TSW is placed in SW register 363 and TTW is placed in TW register 365. This copying of the temporary copies of the status and tag words into respective registers SW 363 and TW 365 normally happens on the last clock of the instruction, which is referred to as "LMI." In contrast, "CNEWI" is the first microinstruction for a new macroinstruction. Floating point unit 78 uses the CNEWI signal to copy what is stored in status word register 363 into TSW register 369 and to copy what is stored in tag word register 365 into TTW register 371.

Ftrap unit 122 also includes trap register 367. Trap register 367 accumulates information during the course of executing an instruction and is cleared upon the last clock of the instruction if no faults are encountered during the course of instruction execution. Trap register 367 of Ftrap unit 122 has the information required by the exception handler for branching to the correct area in the exception handler code. That information includes an error summary bit, bits indicating stack underflow fault or stack overflow fault, a bit indicating an exponent underflow fault or overflow fault, and a bit indicating the sign of accumulator 105. Said bit indicating the sign of accumulator 105 also signifies mantissa overflow fault. Trap register 367 can be read from and written to R bus 138.

Control logic 119 receives microinstructions on lines 87 from control circuitry 70 (of FIG. 1). Control logic 119 in turn provides control for floating point unit 78. Control logic unit 119 includes Fmntr unit 218, Fconr unit 217, Fmicro unit 220, Fdecr unit 223, and Fpla unit 227. Fpla 227 is also referred to as nanosequencer 227.

Control logic 119 also sends out Fbusy and Ferror signals on lines 212. Control logic 119 is coupled to trap circuitry 121 via lines 180. Control logic 119 is coupled to shift count value ("SCVAL") bus 160. Control logic 119 is coupled to accumulator 105 via lines 172. Control logic 119 is also coupled to loop counter 117 via lines 176.

Microcode incoming on lines 87 to control logic 119 is latched in Fmicro unit 220 and decoded in Fdecr unit 223. All signal clock microinstructions are executed as control lines coming out of Fdecr unit 223.

For microprocessor 60 to be able to execute one or more non-floating point instructions in parallel with a multi-clock floating point instruction, floating point unit 78 needs to latch the microcode or microinstruction information and use it all through the execution of the floating point microinstruction. But this one level of latching is not enough to handle the floating point exceptions. In the event that floating point unit 78 raises a floating point error, the microcode jumps to the exception handler microinstructions stored in control ROM 92 (of FIG. 1). The exception handler subroutine may need to issue a multi-clock microinstruction to floating point unit 78, and at a later point request floating point unit 78 to reexecute the original floating point microinstruction. To make such a restart possible, Fmicro unit 220 has a second latch, described below, wherein only the original instruction is latched. Latching is disabled when a floating point error is encountered, to be resumed only after the reexecute command—called "INDIRECT_EXECUTE"—is issued, or in the case where the microcode does not want to come back to this instruction, a "NEWI" instruction is issued, which indicates the start of a new macroinstruction.

FIG. 4 illustrates in block diagram form the architecture of Fmicro unit 220. Incoming microcode is latched in input latch 251. Input latch 251 receives the microcode via lines 87. Input latch 251 is clocked by the phase one clock via lines 242. For timing reasons, the microcode signals, although arriving in phase one, are coming off a phase two latch. Therefore, the first thing floating point unit 78 does is to latch the microcode in input latch 251 and apply the phase one clock via lines 242. Following this input latch 251, there is a three-to-one multiplexer 253, which is 27-bits wide. Following multiplexer 253 is an intermediate latch 255 that is clocked by the phase two clock via lines 244. Lines 222 couple input latch 251 to the three-to-one multiplexer 253. Lines 222 and 224 couple the output of input latch 251 to Fintr unit 104. Lines 232 couple the output of multiplexer 253 to the input to intermediate latch 255. Lines 232 and 230 couple the output of multiplexer 253 to the floating point unit decoders, Fdecr 223 and Fconr 217.

The output of intermediate latch 255 is coupled to the input of execution latch 257 and the input of indirect execute latch 259. Lines 234 and 236 couple intermediate latch 255 to execution latch 257. Lines 234 and 238 couple intermediate latch 255 to indirect execute latch 259. Execution latch 257 is clocked by the phase one clock via lines 246. Gate 261 is an AND gate that performs a logical "AND" of a "latch-OK" signal received from Fconr unit 217 and a phase one clock signal. The output of gate 261 is applied as a signal to indirect execute latch 259 via line 248. The output of execution latch 257 is coupled to the input of multiplexer 253 via lines 226. The output of indirect execute latch 259 is coupled to the input of multiplexer 253 via lines 228. Multiplexer 253 receives control signals DECNEW, DECOLD, and DECUIL via lines 240 from Fconr unit 217. Signal DECNEW causes multiplexer 253 to pass the output of input latch 251 to the input of intermediate latch 255. Signal DECOLD causes multiplexer 253 to pass the output of execution latch 257 to the input of intermediate latch 255. Signal DECUIL causes multiplexer 253 to pass the output of indirect execute latch 259 to the input of intermediate latch 255.

Indirect execution latch 259 retains a copy of the original floating point microinstruction. Execution latch 257, however, can contain the microinstruction that is received during a jump to the exception handler microinstructions.

Returning to FIG. 2, floating point controller 387 controls data movement and operations within floating point unit 78. Floating point controller 387 comprises Fconr unit 217 and Fpla unit 227. Floating point controller 387 decodes the incoming microinstruction sent from Fmicro unit 220 via lines 230 (shown in FIG. 4) and sends out bus source and destination information to the mantissa and exponent data paths. Floating point controller 387 generates control signals for basic arithmetic operations. Controller 387 also handshakes with control unit 70 (of FIG. 1) by sending Fbusy and Ferror signals on lines 212 to control unit 70. Fpla 227 is the sequencer used to execute all multi-clock arithmetic operations. Fpla unit 227 has the algorithms to do all the basic arithmetic operations and some primitive operations used by the microcode during exception handling.

Fconr unit 217 collects information and sends out control signals. Fconr unit 217 also sends signals, such as "Latch-OK," DECNEW, DECOLD, and DECUIL, to Fmicro unit 220 directing the latching and multiplexing of incoming microcode fields in Fmicro unit 220. Fconr 217 generates Fbusy and Ferror signals on lines 212 and sends those signals to control unit 70 of FIG. 1. The Fbusy and Ferror signals are decoded by control unit 70 to determine whether to freeze microcode.

The Fbusy signal is generated by looking at the opcode field of incoming microcode to see if a floating point execute opcode is encoded, that will take more than one clock to execute. After the first clock of execution, the Fbusy signal remains high until the nanosequencer 227 reaches an idle state or a pre-execution assist or post-execution fault is detected.

The Ferror signal is driven high and flagged to control unit 70 when floating point unit 78 needs a pre-execution assist or encounters a post-execution fault. Floating point unit 78 will cease all execution from that point on. Non-reversible operations, such as LMI and write to stack (which may have been issued along with the microinstruction that caused an error), will be aborted. Floating point unit 78 will resume execution only on a wake-up microinstruction or on a microprocessor chip reset.

Fconr unit 217 also generates a signal to the rest of floating point unit 78 that indicates that it is okay to execute an operation. For a non-reversible operation, this signal is taken into account before going much further than the decoding state.

In the last microinstruction for a particular macroinstruction, the microcode can give the result destination, and the microcode can request hardware to shadow the status and tag words and clear the trap register. In the case of pre-execution assist or post-execution fault, the latter operations are aborted, and the trap register is left untouched.

Data movement inside floating point unit 78 of FIG. 2 is either directed by the microcode or by nanosequencer 227. The microcode will direct traffic in instances such as load/store operations, getting operands in the correct register before issuing a FPU_EXECUTE CFPU_EXEC") instruction, fixing operands in case of a assist, or any kind of exception handling routine. Nanosequencer 227 has complete control after microcode has issued a multi-clock FPU_EXEC instruction and floating point unit 78 is ready to go busy. The FPU_EXEC microinstruction specifies the operation to perform on data that has been previously moved to floating point unit 78.

At the same time data is transferred to its destination, the data is checked to see if it is a special case—for example, infinity, not a number, zero, or denormalized—and the flags in the trap register 367 are set accordingly for Sreg 381 and OPA register 375. These flags may be used when the FPU_EXEC microinstruction is issued.

Microcode must intervene to help floating-point unit 78 in performing operations from time to time. This intervention is in the form of a microcode assist or fault.

As stated in the background, exceptions are divided into two types of problems: (1) pre-execution assist and (2) post-execution fault.

Pre-execution assists occur if the operand value is not correct for there to be a continuation of the particular operation—for example, the operand is an unsupported number, not a number, infinity, or zero.

Post-execution faults occur in several different cases, as set forth as follows:
 (1) When the overflow condition is present and the operation is subject to overflow.
 (2) When the underflow condition is present and the operation is subject to underflow.
 (3) Stack overflow and underflow faults. Faults also occur when the error summary bit is set in trap register 367.

In the case of either a pre-execution assist or a post-execution fault, the microcode will deal with the exception conditions and produce the correct result. When complaining to the microcode, the floating point unit 78 does not distinguish between an assist and a fault. The floating point unit 78 just raises the Ferror signal on lines 212 and stops all execution from that point on. The microcode will service the fault at the next sequential floating point microinstruction. Once the next sequential floating point microinstruction is reached, the microcode freezes, waiting for the Fbusy signal on line 212 to go away. Once the Fbusy signal goes away and if Ferror is a logical high, then the microcode jumps to the exception handler microinstructions. During exception handling, the first thing the microcode does is to issue a wake-up microinstruction. After the wake-up microinstruction, the floating point unit 78 will start execution of the exception handler floating point microinstructions. At the end of the exception handling, the microcode may issue an indirect execute instruction (also referred to as INDIRECT_EXECUTE), after which floating point unit 78 will reexecute the original floating point microinstruction which caused the error to be raised. Alternatively, floating point unit 78 will execute the next sequential floating point microinstruction.

The method of handling exceptions associated with a floating point instruction is illustrated in FIG. 5. At step 270, floating point macroinstruction $FI_1$ is decoded into one or more microinstruction addresses that are read from control ROM 92 to the Fmicro unit 220 of floating point 78 for execution. Said execution typically takes more than one clock cycle to complete.

During the execution of floating point microinstruction $FI_1$ by floating point unit 78, Fconr unit 217 raises the Fbusy signal on line 212 to a logical high. During the execution of floating point instruction $FI_1$, Fconr unit 217 checks for the presence of a pre-execution assist or a post-execution fault. If a pre-execution assist is necessary or a post-execution fault occurs, the floating point unit does not distinguish between an assist and a fault. Instead, Fconr 217 just raises the Ferror signal on line 212 to indicate to control unit 70 of FIG. 2 that an error has occurred. The appropriate bits are also set in trap register 367 to indicate what type of error occurred. Control unit 70 then can access trap register 367 to discover what error occurred.

Meanwhile, while floating point microinstruction $FI_1$ was being executed by floating-point unit 78, integer instructions $I_2$ and $I_3$, etc., were being executed by data bus unit 76 of microprocessor 60. In particular, at respective steps 272 and 274, integer microinstructions were transferred from control ROM 92 of microprocessor 60 to data path unit 76.

During the execution of floating point microinstruction $FI_1$, $FI_1$ was latched into input latch 251 of Fmicro unit 220 illustrated in FIG. 4. The microinstruction $FI_1$ was then transferred via lines 222, multiplexer 253, lines 232, intermediate latch 255, and lines 234, 236, and 238 to be latched into execution latch 257 and indirect execute latch 259. Thus, microinstruction $FI_1$ was latched in execution latch 257 and indirect execute latch 259 of Fmicro unit 220. Said latching was done under the control of Fconr unit 217. A DECNEW signal sent by Fconr unit 217 to multiplexer 253 caused multiplexer 253 to pass the output of input latch 251 to the input of intermediate latch 255. Fconr unit 217 also sent a logical high "latch-OK" signal to gate 261 to permit the latching of $FI_1$ into indirect execute latch 259.

Once the Ferror signal is raised on line 212, floating point unit 78 stops all execution of floating point microinstruction $FI_1$ from that point on. The microcode of control unit 70 will service the fault at the next sequential floating point microinstruction, which is floating point microinstruction $FI_2$ at step 280 shown in FIG. 5.

Once floating-point instruction $FI_2$ is reached at step 280, control unit 70 of FIG. 1 looks to the Fbusy and Ferror signals on lines 212. If the Fbusy and Ferror signals are both low, then floating point unit 78 executes floating point microinstruction $FI_2$. If the Fbusy signal is low and the Ferror signal is high, then control unit 70 jumps to the exception handler microinstructions of control ROM 92. If the Fbusy line is high and the Ferror line is low, then floating point unit 78 continues executing floating point microinstruction $FI_1$, but does not execute floating point microinstruction $FI_2$ until instruction $FI_1$ is completed. If the Fbusy and Ferror signals are both high, this is a "don't care" condition because control unit 70 only looks at the Ferror pin after the Fbusy pin goes low.

If the Ferror signal is high, the microcode will jump to the exception handler microinstructions of control ROM 92. The jump to the floating point exception handler microinstructions is shown as step 282 in FIG. 5. The first thing the microcode does after jumping to the exception handler microinstruction is to issue a wake-up microinstruction. The jump to the exception handler microinstruction takes two clock cycles.

As soon as the Ferror signal goes high, latching into indirect execute latch 259 (of FIG. 4) is disabled. The disabling of indirect execute latch 259 is caused by a logical low "latch-OK" signal being sent to gate 261 by Fconr unit 217. The resulting logical low output signal from AND gate 261 is then applied to indirect execute latch 259 via line 248. This keeps indirect execute latch 259 from receiving the next microinstruction. Again, the "latch OK" signal applied to gate 261 is controlled by Fconr unit 217, which also issues the Ferror signal on lines 212. Anytime there is a jump to the exception handler of control ROM 92, there will also be an Ferror signal on lines 212. Therefore, latching into indirect execute latch 259 will be disabled during the execution of the exception handler microinstructions.

It follows, therefore, that wake-up microinstruction 284 will be stored only in latch 257 of Fmicro unit 220, and not in indirect execute latch 259. Instead, indirect execute latch 259 will retain a copy of floating point microinstruction $FI_1$.

Latching into indirect execute latch 259 is resumed only if:
(1) A reexecute command is issued (also referred to as the INDIRECT_EXECUTE command) or
(2) A NEWI microinstruction is issued. A NEWI microinstruction indicates the start of a new macroinstruction.

During the exception handler subroutine, the exception handler will issue microcode, such as floating point microinstruction $fi_1$ at step 286 of FIG. 5. Exception handler floating point microinstruction $fi_1$ will be stored in latch 257 of Fmicro unit 220 and not in indirect execute latch 259. This second level of latching allows the handling of floating point exceptions.

At the end of the exception handler microinstructions, there could be an INDIRECT_EXECUTE command. If there is INDIRECT_EXECUTE command, floating point unit 78 will reexecute the instruction which faulted—namely, instruction $FI_1$—before executing instruction $FI_2$. This is shown as step 290 in FIG. 5. Steps 272 and 274 are not repeated and integer microinstructions $i_2$ and $i_3$ are not reexecuted. If there is no INDIRECT_EXECUTE command, then floating point microinstruction $FI_1$ is not reexecuted. Instead, the microcode simply goes forward and executes floating point microinstruction $FI_2$. $FI_2$ would be a NEWI microinstruction if there is to be a start of a new macroinstruction.

Thus, by having both an execution latch 257 and an indirect execute latch 259, as shown in FIG. 4, floating point instructions can be executed in parallel with non-floating-point instructions, even though floating point unit 78 shares control unit 70 with microprocessor 60. In addition, exceptions associated with a first floating point instruction can be handled upon reaching the next sequential floating point instruction.

In a preferred embodiment of the present invention, there cannot be an exception situation within an exception situation. Microcode will not issue any microinstruction which can cause an error during the exception condition.

Reference is made to FIG. 6, which is a flow chart of operation of the preferred embodiment.

As illustrated beginning in a box 400, the next microinstruction is obtained from the decoder 68 and the control ROM 92. Decoding macroinstructions into a group of microinstructions is conventional. It should be understood that each macroinstruction decoded in the decoder 68 points to one or more microinstructions in control ROM 92. For example a single floating point macroinstruction may point to a series of five floating point microinstructions, the next macroinstruction may be an integer macroinstruction that points to two integer microinstructions, the subsequent macroinstruction may be another integer macroinstruction that points to three integer microinstructions, and the next macroinstruction may be a floating point macroinstruction that points to eight microinstructions.

After the box 400 in which a microinstruction has been provided from the control ROM 92, the flowchart in FIG. 6 indicates that the next step is a decision, in a decision box 402, as to whether or not the microinstruction is a floating point instruction. If it is not a floating point instruction, then as illustrated in a box 404, the microinstruction is provided to the execution unit 76 where it is executed appropriately. However, if the microinstruction is a floating point instruction or a floating point exception microinstruction, then, as illustrated in a decision box 406, the signal $F_{busy}$ is checked to see if it is on or off. The $F_{busy}$ signal is generated in FP control unit 217 as described with reference to FIG. 2 and FIG. 5, which looks at the incoming microcode to see if a floating point execute opcode is encoded that will take more than one clock. If so, the $F_{busy}$ signal remains high until the FP nanosequencer unit 227 reaches an idle state or a pre-execution assist or post-execution fault is detected.

If in the decision box 406, $F_{busy}$ indicates that the floating point processor 78 is currently in use then the microprocessor simply waits as illustrated in a time out box 408 until the floating point processor 78 becomes available and $F_{busy}$ no longer signals it as active. After the $F_{busy}$ signal is deasserted, operation proceeds to a decision box 410 in which the signal $F_{error}$ is checked to determine whether or not an error was noted in the previous floating point instruction. The $F_{error}$ signal is generated in the FP control unit 217 (FIG. 2), and is asserted when the floating point unit 78 needs a pre-execution assist or encounters a post-execution fault (i.e., when it encounters an exception).

If $F_{error}$ is asserted, the decision box 410 branches to the exception handler microinstructions, as illustrated beginning in a box 412, in which a wake-up microinstruction is issued which wakes up the floating point unit. After the wake-up instruction in the box 412, the floating point unit 78 begins execution of the selected exception handler microinstructions, as illustrated in a box 414. Upon completion of the exception handler microinstructions, a decision is made regarding re-execution of the exception-causing microinstruction as illustrated in the decision box 416. If re-execution is desired, then the microinstruction is re-executed as illustrated in a box 418 before continuing on with execution of the microinstruction awaiting conclusion of handling the exception. This decision is discussed above, wherein it is stated that an indirect execute instruction may be issued by the microcode to re-execute the original microinstruction, and alternately, floating point unit 78 will execute the next sequential floating point microinstruction.

Operation will proceed to an execution box 420 through either the decision box 410 directly if no error was noted from the previous floating point microinstruction (i.e. $F_{error}$ was not asserted), or through the boxes 412, 414, 416, and 418 following exception handling. As illustrated in the box 420, the floating point microinstruction begins execution, and operation returns to the box 400 to get the next microinstruction. However, during execution of the floating point microinstruction, operation also branches in parallel to a box 430 in which the $F_{busy}$ signal is asserted to signify that the floating point unit 78 is busy. After assertion of the $F_{busy}$ signal, execution continues as illustrated in a decision box 432. If execution is completed without an exception being detected, then, as illustrated in the box 434, the $F_{busy}$ signal will be de-asserted and the floating point unit 78 stands ready to execute the next floating point instruction, as illustrated in the box 436. However, if an exception is detected, as illustrated in a decision box 438, then execution of the microprocessor is halted as illustrated in a box 440, and the $F_{error}$ signal is asserted as illustrated in a box 442. Then, the floating point unit 78 awaits handling of the error as discussed above and illustrated in the decision box 410.

Latching into a first and second latch is specified in the box 420, in which the microinstruction is stored in a first and a second latch for execution, as discussed above with reference to FIG. 4. As illustrated in the box 414, the exception handler microinstructions are executed using only the first latch, therefore leaving the microinstruction in the second latch untouched. After completion of the exception handling, the microinstruction in the second latch may be executed, as illustrated in the box 418.

Appendix 1 sets forth a Linpack inner loop. Linpack inner loops are relatively common matrix equations. Linpack inner loops are used as benchmarks for comparing the floating point performance of microprocessors. The Linpack inner loop of Appendix 1 includes both floating point instructions and non-floating point instructions. In the Linpack inner loop of Appendix 1, dummy reads ("dummy rds") have been added to avoid cache misses. The dummy reads have been added at points where floating point instructions are being executed in parallel with non-floating point instructions, so the addition of the dummy reads does not cost any execution clock cycles. Parallelism alone leads to performance gains, but the addition of the dummy reads shows that one can add instructions to take further advantage of the parallelism of floating point/non-floating point instruction execution in order to achieve further performance gains. Indeed, with parallel execution of floating point and non-floating instructions during execution of the Linpack inner loop of Appendix 1, there is an overall improvement in performance of the microprocessor of approximately 20 percent over non-parallel operation.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

APPENDIX 1

Y[i] := Y[i] + C*X[i]
Loop1:

| | | |
|---|---|---|
| fstp | dword ptr y[ecx] | ;y[i−1] |
| Fld | st | ;duplicate constant |
| Fmul | dword ptr x[ecx+8] | ;X[i] |
| mov | eax, dword ptr y[ecx+8] | ;dummy rd, cache miss |
| add | ecx, 8 | ;i = i+1 |
| mov | eax, dword ptr x[ecx+8] | ;dummy rd, cache miss |
| Fadd | dword ptr y[ecx] | ;Y[i] |
| cmp | ecx, ebx | ;limit check |
| jne | loop1 | |

What is claimed is:

1. A computer processing circuit for processing a series of macroinstructions in dual processing paths including a first processing path and a second processing path, said macroinstructions including macroinstructions of a first type for processing in said first processing path and macroinstructions of a second type for processing in said second processing path, said computer processing circuit comprising:

an instruction decode unit for receiving and decoding the series of macroinstructions;

a control unit coupled to the instruction decode unit for receiving the decoded macroinstructions, said decoded macroinstructions including decoded macroinstructions of the first type and decoded macroinstructions of the second type, said control unit providing microinstructions of the first type in response to said decoded macroinstructions of the first type, said control unit providing microinstructions of the second type in response to said decoded macroinstructions of the second type, said control unit including a control ROM including exception handler microinstructions, said control unit also providing said exception handler microinstructions at its output;

a first processing path coupled to the control unit for receiving and processing said microinstructions of the first type and said exception handler microinstructions, said first processing path including control logic and a decoder;

a second processing path coupled to the control unit for receiving and processing said microinstructions of the second type; and said first processing path further including a latching unit for receiving and selectively storing said microinstructions, said latching unit including a multiplexer having a plurality of inputs selectable by a multiplexer control signal provided by said control logic in the first processing path, said plurality of inputs including a first input coupled to the control unit for receiving said microinstructions from said control unit, said multiplexer having an output connected to the control logic in the first processing path;

an execution latch for holding a currently executing microinstruction, said execution latch having a latch input connected to the multiplexer output, said execution latch also having a latch output connected to a second input of said plurality of inputs to the multiplexer;

an indirect execute latch for holding a microinstruction, said indirect execute latch having a latch input connected to the multiplexer output, said indirect execute latch also having a latch output connected to a third input of said plurality of inputs to the multiplexer;

said multiplexer control signal selecting one said plurality of multiplexer inputs, said multiplexer control signal selecting said first input when said first processing path is ready to accept a subsequent microinstruction from said control unit, said second input during execution of a multi-clock microinstruction within said first processing path, and said third input to re-execute a microinstruction stored in said indirect execute latch;

timing means for latching the multiplexer output simultaneously into said execution latch and said indirect execute latch; and said control logic being responsive to said exception handler microinstructions for disabling said timing means to prevent latching said exception handler microinstructions into the indirect execute latch.

2. The computer processing circuit of claim 1, wherein the latching circuit further comprises an input latch for latching a microinstruction from the control unit into the multiplexer.

3. The computer processing circuit of claim 2, wherein the first processing path further comprises a data interface unit having control logic associated therewith, said interface unit being connected to receive microinstructions from the connection between the input latch and the multiplexer input.

4. The computer processing circuit of claim 2, wherein the latching unit further comprises an intermediate latch having an input connected to the multiplexer output, said intermediate latch having an output connected both to the execution latch input and to the indirect execute latch input.

5. The computer processing circuit of claim 4, further comprising a first timing means for latching the input latch on a phase one clock, a second timing means for latching the intermediate latch on a phase two clock that is behind the phase one clock, and a third timing means for latching the execution latch on a phase one clock signal, so that a microinstruction latched into the input latch on the phase one clock is latched into the execution latch on the subsequent phase one clock signal.

6. The computer processing circuit of claim 5 further comprising a fourth timing means for latching the indirect execute latch upon the coincidence of a phase one clock signal and a signal that is provided when no exception has been detected.

7. The computer processing circuit of claim 1 wherein the control ROM comprises:

a plurality of microinstruction sequences of the first type; and a plurality of microinstruction sequences of the second type.

8. A computer processing circuit for processing a series of macroinstructions in dual processing paths including a first processing path and a second processing path, said macroinstructions including macroinstructions of a first type for processing in said first processing path and macroinstructions of a second type for processing in said second processing path, said computer processing circuit comprising:

an instruction decoding means for receiving and decoding the series of macroinstructions;

a control means coupled to the instruction decoding means for receiving a decoded macroinstruction and supplying one or more microinstructions at a microinstruction output, said one or more microinstructions being of the first type if said decoded macroinstruction is of the first type, said one or more microinstructions being of the second type if said decoded macroinstruction is of the second type, said control means having a control ROM including a plurality of exception handler microinstruction sequences, said control means providing said exception handler microinstruction sequences at said microinstruction output;

a first processing path coupled to the microinstruction output for receiving and processing said microinstructions of the first type and said exception handler microinstruction sequences, said first processing path including control logic and a decoder for processing said plurality of first microinstruction sequences;

a second processing path coupled to the microinstruction output for receiving and processing said microinstructions of the second type, said second processing path for processing said plurality of second microinstruction sequences; and said first processing path further including a latching means for receiving and selectively storing said microinstructions, said latching means including a multiplexer means having a plurality of inputs selectable by a multiplexer control signal provided by said control logic in the first processing path, said plurality of inputs including a first input coupled to the microinstruction output of the control means for receiving said microinstructions from said control means, said multiplexer means having an output connected to the control logic in the first processing path;

an execution latch means for holding a currently executing microinstruction, said execution latch means having a latch input means connected to the output of the multiplexer means, said execution latch means also having a latch output means connected to a second input of said plurality of inputs to the multiplexer means;

an indirect execute latch means for holding a microinstruction, said indirect execute latch means having a latch input means connected to the output of the multiplexer means, said indirect execute latch means also having a latch output means connected to a second input of said plurality of inputs to the multiplexer means;

said multiplexer control signal selecting one said plurality of multiplexer inputs, said multiplexer control signal selecting said first input when said first processing path is ready to accept a subsequent microinstruction from said control unit, said second input during execution of a multi-clock microinstruction within said first processing path, and said third input to re-execute a microinstruction stored in said indirect execute latch;

timing means for latching the output of the multiplexer means simultaneously into said execution latch means and said indirect execute latch means; and said control logic being responsive to said exception handler microinstructions for disabling said timing means to prevent latching said exception handler microinstruction sequences into the indirect execute latch means.

9. The computer processing circuit of claim 8, wherein the latching means further comprises an input latch means for latching a microinstruction from the microinstruction output into the multiplexer means.

10. The computer processing circuit of claim 9, wherein the first processing path further comprises a data interface means having control logic associated therewith, said data interface means being connected to receive microinstructions from the connection between the input latch means and the input to the multiplexer means.

11. The computer processing circuit of claim 9, wherein the latching means further comprises an intermediate latching means having an input connected to the output of the multiplexer means, said intermediate latching means having an output connected both to the input of the execution latch means and to the input of the indirect execute latch means.

12. The computer processing circuit of claim 11, further comprising a first timing means for latching the input latch means on a phase one clock, a second timing means for latching the intermediate latching means on a phase two clock that is behind the phase one clock, and a third timing means for latching the execution latch means on a phase one clock signal, so that a microinstruction latched into the input latch means on the phase one clock is latched into the execution latch means on the subsequent phase one clock signal.

13. The computer processing circuit of claim 12 further comprising a fourth timing means for latching the indirect execute latch means upon the coincidence of a phase one clock signal and a signal that is provided when no exception has been detected.

14. The computer processing circuit of claim 8, wherein the control ROM comprises:
a plurality of microinstruction sequences of the first type; and
a plurality of microinstruction sequences of the second type.

15. The computer processing circuit of claim 8, wherein the first processing path further comprises a data interface means having control logic associated therewith, said interface means being connected to receive microinstructions from the connection between the microcode input and the input to the multiplexer means.

16. The computer processing circuit of claim 8, wherein the latching means further comprises an intermediate latching means having an input connected to the output of the multiplexer means, said intermediate latching means having an output connected both to the input of the execution latch means and to the input of the indirect execute latch means.

17. The computer processing circuit of claim 16, further comprising a first timing means for latching the intermediate latching means on a phase two clock that is behind a phase one clock, and a second timing means for latching the execution latch means on a phase one clock signal, so that a microinstruction latched into the intermediate latching means on the phase two clock is latched into the execution latch means on the subsequent phase one clock signal.

18. The computer processing circuit of claim 17 further comprising a third timing means for latching the indirect execute latch means upon the coincidence of the phase one clock signal and a signal that is provided when no exception has been detected.

19. A computer processing circuit for processing a series of macroinstructions in dual processing paths including a first processing path and a second processing path, said macroinstructions including macroinstructions of a first type for processing in said first processing path and macroinstructions of a second type for processing in said second processing path, said computer processing circuit comprising:
   an instruction decoding means for receiving and decoding the series of macroinstructions;
   a control means coupled to the instruction decoding means for receiving a decoded macroinstruction and supplying one or more microinstructions at a microinstruction output, said control means having a control ROM including a plurality of exception handler microinstruction sequences, a plurality of first microinstruction sequences associated with said macroinstructions of the first type, and a plurality of second microinstruction sequences associated with said macroinstructions of the second type, said control means providing microinstructions of the first type in response to said macroinstructions of the first type, said control means providing microinstructions of the second type in response to said macroinstructions of the second type, said control means providing one of said microinstructions at said microinstruction output;
   a first processing path coupled to the microinstruction output for receiving and processing said microinstructions of the first type and said exception handler microinstruction sequences, said first processing path including control logic and a decoder for processing said plurality of first microinstruction sequences;
   a second processing path coupled to the microinstruction output for receiving and processing said microinstructions of the second type, said second processing path for processing said plurality of second microinstruction sequences; and
   said first processing path further including a latching means for receiving and selectively storing said microinstructions, said latching means including
      a multiplexer means having a plurality of inputs selectable by a multiplexer control signal provided by said control logic in the first processing path, said plurality of inputs including a first input coupled to the microinstruction output of the control means for receiving said microinstructions, said multiplexer means having an output connected to the control logic in the first processing path;
      an execution latch means for holding a currently executing microinstruction, said execution latch means having a latch input means connected to the output of the multiplexer means, said execution latch means also having a latch output means connected to a second input of said plurality of inputs to the multiplexer means;
      an indirect execute latch means for holding a microinstruction, said indirect execute latch means having a latch input means connected to the output of the multiplexer means, said indirect execute latch means also having a latch output means connected to a third input of said plurality of inputs to the multiplexer means;
   said multiplexer control signal selecting one said plurality of multiplexer inputs, said multiplexer control signal selecting
      said first input when said first processing path is ready to accept a subsequent microinstruction from said control unit,
      said second input during execution of a multi-clock microinstruction within said first processing path, and
      said third input to re-execute a microinstruction stored in said indirect execute latch;
   timing means for latching the output of the multiplexer means simultaneously into said execution latch means and said indirect execute latch means; and
   said control logic being responsive to said exception handler microinstructions for disabling said timing means to prevent latching said exception handler microinstruction sequences into the indirect execute latch means.

* * * * *

UNITED STATES PATENT AND TRADEMARK OFFICE
CERTIFICATE OF CORRECTION

| | | |
|---|---|---|
| PATENT NO. | : | 5,421,021 |
| DATED | : | May 30, 1995 |
| INVENTOR(S) | : | Avtar K. Saini |

It is certified that error appears in the above-identified patent and that said Letters Patent is hereby corrected as shown below:

In column 9 at line 64 delete "," following "encoded" and prior to "that"

In column 18 at line 14 delete "handier" and insert --handler--

Signed and Sealed this

Twenty-ninth Day of July, 1997

Attest:

BRUCE LEHMAN

Attesting Officer

Commissioner of Patents and Trademarks